United States Patent [19]

Sternberg et al.

[11] 4,446,434
[45] May 1, 1984

[54] HYDROCARBON PROSPECTING METHOD WITH CHANGING OF ELECTRODE SPACING FOR THE INDIRECT DETECTION OF HYDROCARBON RESERVOIRS

[75] Inventors: Ben K. Sternberg; Dale E. Miller; Dhari S. Bahjat, all of Ponca City, Okla.

[73] Assignee: Conoco Inc., Ponca City, Okla.

[21] Appl. No.: 245,780

[22] Filed: Mar. 20, 1981

Related U.S. Application Data

[62] Division of Ser. No. 971,177, Dec. 20, 1978, Pat. No. 4,295,096.

[51] Int. Cl.³ .............................................. G01V 3/06
[52] U.S. Cl. ..................................... 324/363; 324/357
[58] Field of Search ................ 324/347, 357, 360–364, 324/376

[56] References Cited

U.S. PATENT DOCUMENTS

| | | | |
|---|---|---|---|
| 2,183,565 | 12/1939 | Hawley | 324/372 |
| 2,190,320 | 2/1940 | Potapenko | 324/362 |
| 2,192,404 | 3/1940 | Jakosky | 324/363 |
| 2,211,125 | 8/1940 | Jakosky | 324/363 |
| 2,293,024 | 8/1942 | Klipsch | 324/364 |
| 2,304,739 | 12/1942 | Minton | 324/364 X |
| 2,395,617 | 2/1946 | Doll | 324/376 |
| 2,730,673 | 1/1956 | Jakosky | 324/363 |
| 2,988,690 | 6/1961 | Love et al. | 324/357 |
| 4,041,372 | 8/1977 | Miller et al. | 324/357 |

*Primary Examiner*—Gerard R. Strecker
*Attorney, Agent, or Firm*—William J. Miller

[57] ABSTRACT

A method and apparatus for electromagnetic hydrocarbon exploration which is accomplished by implanting at least two pairs of electrodes into the ground. One pair transmits a signal into the earth, and the other pair receives the signal. With proper processing the polarization and resistivity of the ground can be calculated. The components are arranged in a manner to insure that the electromagnetic coupling can be determined and can be removed from the measurements. Electrode spacing can be varied to focus on the anomalous stratum. If an anomalous stratum is discovered, it is cored to determine the nature of the material creating the anomaly.

8 Claims, 16 Drawing Figures

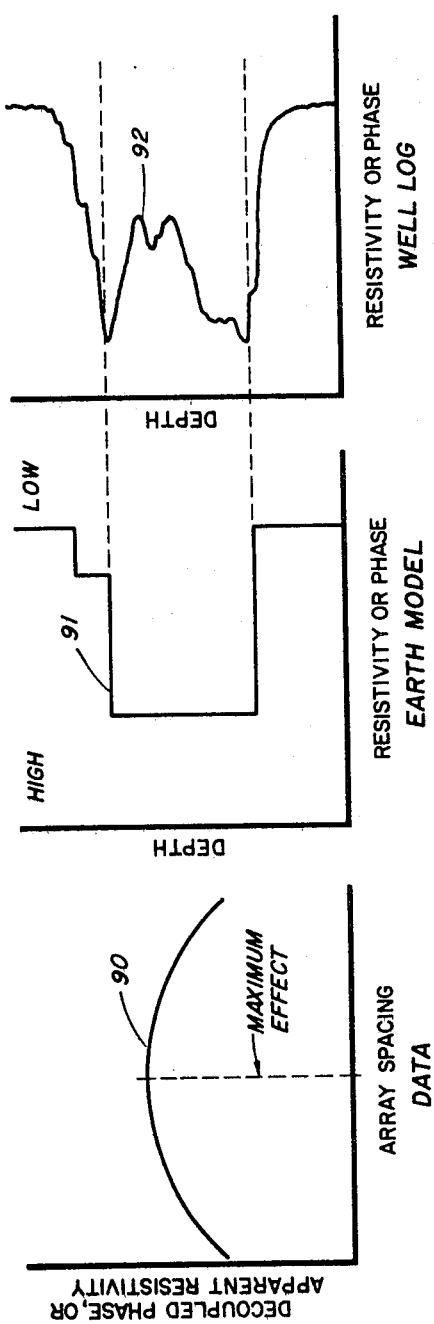
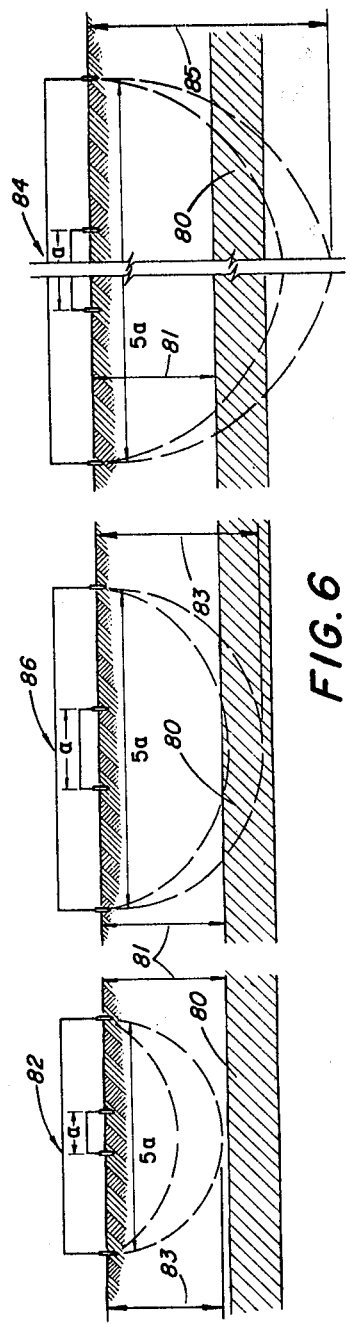
FIG. 7
FIG. 6

HYDROCARBON PROSPECTING METHOD WITH CHANGING OF ELECTRODE SPACING FOR THE INDIRECT DETECTION OF HYDROCARBON RESERVOIRS

This application is a divisional of U.S. Ser. No. 971,177 filed Dec. 20, 1978, by the same inventors, now U.S. Pat. No. 4,295,096.

BRIEF DESCRIPTION OF THE INVENTION

This invention comprises a method for indirectly detecting the presence of hydrocarbon reservoirs by mapping electrical anomalies in the near surface which are apparently caused by hydrocarbon seepage. In the preferred embodiment of the invention, an array is used to transmit current into the ground and to receive the resulting complex voltages. Both the magnitude and phase of the voltage are measured relative to the values for the transmitted current.

From the magnitude of the received voltage, an apparent resistivity of the earth is calculated, and from the phase of the received signal, a measured phase is determined which is related to both anomalous polarization in the earth and to electromagnetic coupling in the array. The signal is then further processed to eliminate the effects of the electromagnetic coupling. The resultant decoupled phase angle accurately indicates anomalous polarizable material in the earth. The processed signal is then mapped in a manner to illustrate the apparent resistivity and/or the decoupled phase angle values.

If a well-defined anomaly is present by the mapping of the apparent resistivity and/or the decoupled phase angle, it is often a shallow electrical expression of a deeper hydrocarbon reservoir, possibly due to changes in the shallow electrical properties of the earth as a result of hydrocarbon seepage from the deeper reservoir.

The invention also discloses a method for focusing on the shallow anomalous formation by varying the array spacing and, therefore, the depth of penetration. The anomalies are further evaluated by drilling inexpensive shallow wells into the anomalous formation and studying the rocks to determine if the anomaly is due to seepage of hydrocarbons or due to some other physical phenomenon.

BRIEF DESCRIPTION OF THE FIGURES

FIG. 1(a) is a cross-section of the electrical wiring used in the schematic shown in FIG. 1 through the lines 1(a)—1(a);

FIG. 6 is an illustration of the depth of penetration for various spacings of the Schlumberger array;

FIG. 7 is a summary of the steps taken to evaluate a near surface anomaly;

DETAILED DESCRIPTION OF THE INVENTION

Figure 1:
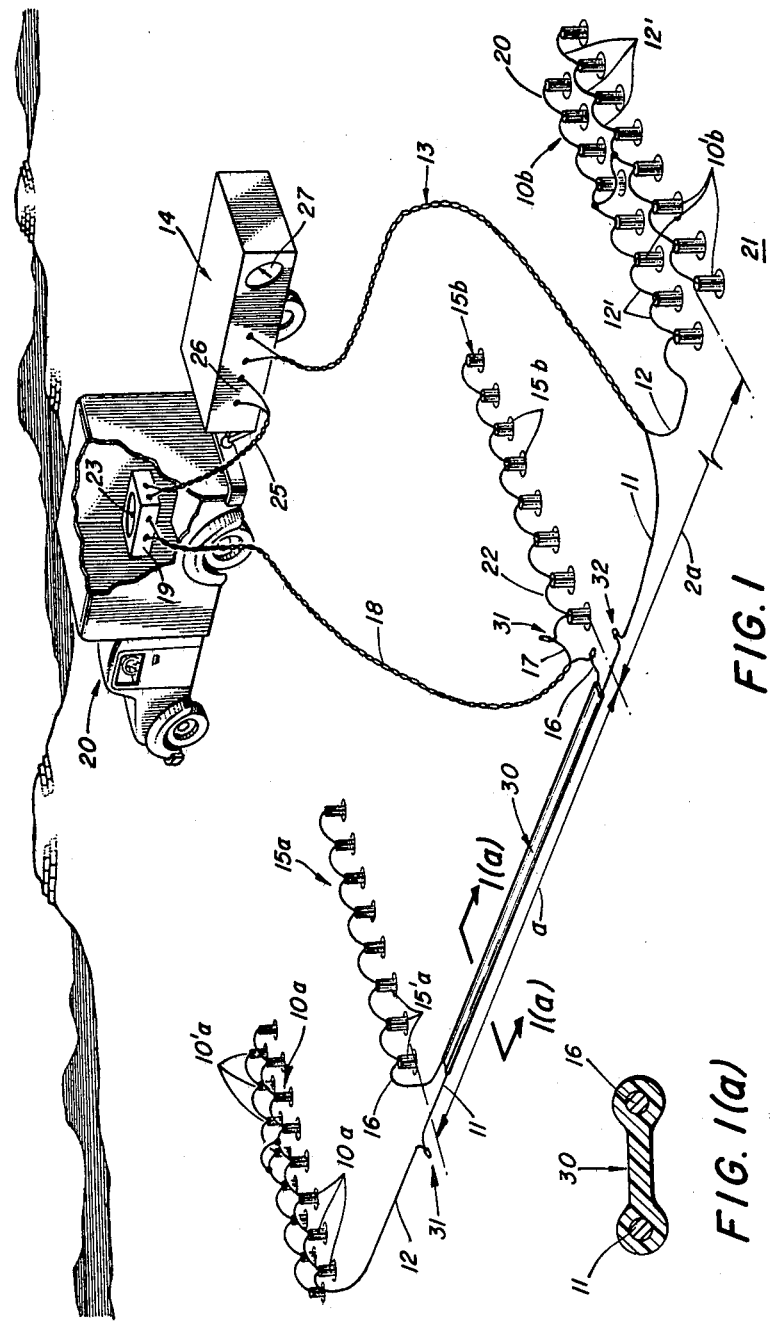
FIG. 1 is a schematic illustrating a field layout for performing the invention.
Figure 2:
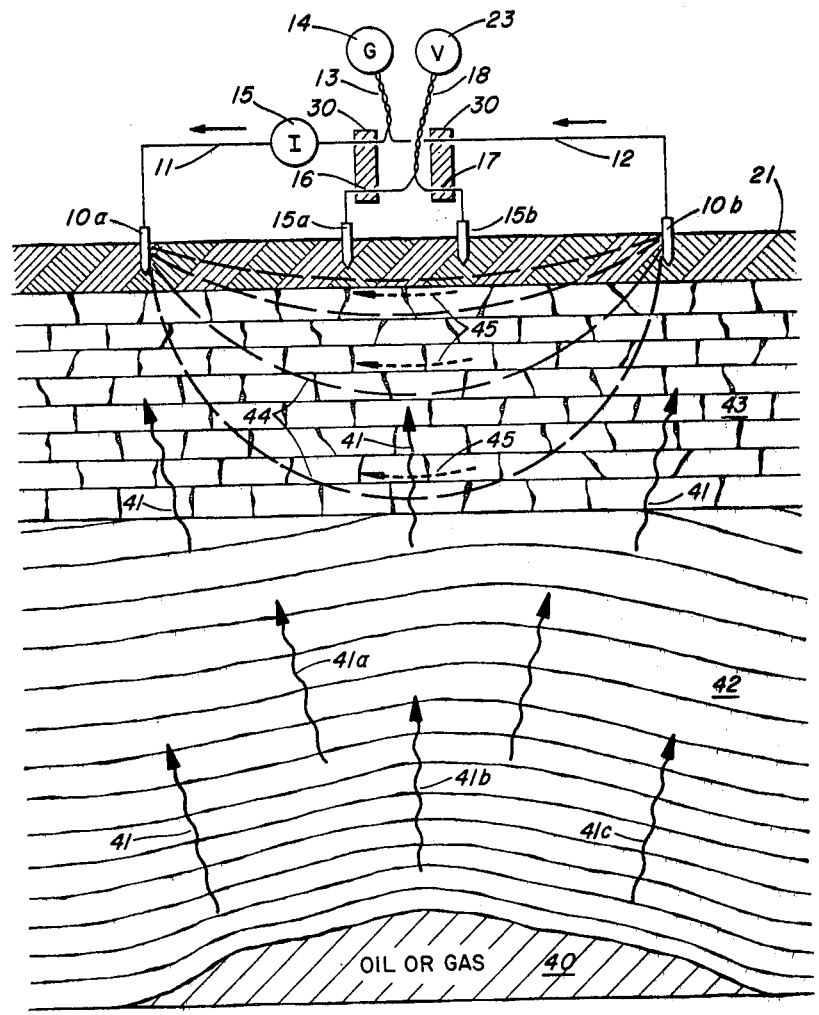
FIG. 2 is a diagram illustrating the operation of the invention carrying out the electrical survey.

Referring to all of the figures but in particular to FIGS. 1, 1(a), and 2, a preferred field layout is illustrated for making the electrical measurements. The array illustrated in the above-mentioned figure is an array commonly referred to as the Schlumberger array.

Referring in particular to FIG. 1, the Schlumberger array comprises a first pair of electrode means 10a and 10b coupled through wires 11 and 12, respectively, to a twisted pair 13 and then to a current generating source 14. Source 14 will include a current characteristic measuring device 27 for detecting the current phase and magnitude when the exploration is being conducted in the frequency domain, or wave forms and magnitude when in the time domain, being supplied through wires 11 and 12 to electrodes 10a and 10b. A second pair of electrode means 15a and 15b is coupled through a pair of wires 16 and 17 to a twisted pair of wires 18 and then to an analyzer 19 which is usually mounted in a truck generally referred to by the arrow 20 and also includes a voltage characteristic measuring device 23 for detecting the voltage phase and magnitude. Electrodes 10a and 10b generally comprise a plurality of electrodes 10'a and 10'b which are connected to the ground in parallel to wire 12 so that the contact resistance with the surface of the ground 21 is below a maximum designated amount. Likewise electrodes 15a and 15b comprise a plurality of electrodes 15'a and 15'b which are coupled through a plurality of wires 22 in parallel to the ground so that the contact resistance through the ground of electrode 15b will have less than a maximum prescribed resistance. In order to insure proper contact with the ground, all of the electrodes 10'a, 10'b in arrays 10a, 10b, and 15'a, 15'b in arrays 15a, 15b may be watered down with salt water and detergent mixture or other suitable means for reducing the contact resistance to the prescribed maximum amount.

For a Schlumberger array the spacing between electrodes 15a and 15b as illustrated in FIG. 1 is defined as being "a". The spacing between electrodes 15b and 10b or 15a and 10a is "2a," or twice the distance of the spacing between the electrodes 15a and 15b. Therefore, the distance between electrodes 10a and 10b is 5a. Typically, the entire spacing between 10a and 10b can vary between a few hundred feet to a few thousand feet.

Current generating source 14 should be capable of generating a periodic low frequency current. The current should, preferably, contain a smoothly varying wave form. If the wave form, for example, contains fast rise time transients, noise could be inductively coupled into receiver 19 or the wires associated therewith causing non-linear behavior in the receiver. The frequency of the low frequency current is typically 0.1 Hertz; however, the frequency may vary from as low as 0.001 to as high as 100 Hertz. The generator should preferably have a minimum power rating of approximately 2.5 kilowatts with a typical current into the ground of 2 to 5 amperes and voltage of from 200 to 500 volts.

In the preferred embodiment, current characteristic measuring device 27 and voltage characteristic measuring device 23 are combined into a single unit as part of analyzer 19. Analyzer 19 may be a programmable device and have the capacity to automatically calculate, in the field, all the quantities described in subsequent portions of this application.

It is, likewise, preferable that the current generator source 14 be isolated from the circuit of analyzer 19. If there is any leakage of current from high current source 14 into the sensitive analyzer 19, the measurement will be distorted. To assure that there is no breakdown of isolation, it may be desirable to physically separate the transmitter and receiver in different trucks as illustrated.

It should be noted that an important criterion for the operation of this invention is the maintenance of a determinable electromagnetic coupling between wires 13, 18, 11 and 16, particularly, insofar as they are parallel to each other because energy will be coupled from transmitting wire 11 into receiving wire 16. In order to provide a determinable electromagnetic coupling when the wires are parallel to each other, a twin lead 30 is provided between junctions 31 and 32. Twin lead 30 is illustrated in FIG. 1(a), which is a cross-sectional view of the twin lead 30 shown in FIG. 1. The twin lead provides a method of maintaining an exact separation between wires 11 and 16, thereby, insuring a determinable electromagnetic coupling between the wires. This electromagnetic coupling, when it is calculable, can be accounted for during later processing of the signal data.

Wires 18 and 13 are connected from transmitter 14 and analyzer 19, respectively, to the respective electrodes through twisted pairs. The twisted pairs provide a means for cancelling electromagnetic coupling for that portion of the connecting wires, thereby assuring the maintenance of a constant electromagnetic coupling in the non-paired connecting wires. Wires 25 couple the analyzer 19 to generator 14 so that the operation of the generator can be controlled by analyzer 19. It is obvious that this link could be made by radio, or generator 14 could be preprogrammed and started at the proper time by any means such as pushing a button.

The electrode sets 10a and 15a, 15b and 10b, when implanted into the ground, must be of sufficiently low resistance so that data are properly acquired. In order to accomplish the above, the contact resistance of the current electrode sets 10a and 10b should, if possible, be approximately 100 ohms or less while the contact resistance of the potential electrode sets 15a and 15b should be kept, if possible, below a few hundred ohms. The contact resistance of the current electrodes is measured by replacing current generator 14 and current characteristic measuring device 27 with a standard ohmmeter and measuring the DC resistance. Likewise the contact resistance of the potential electrode sets 15a and 15b is measured by replacing voltage characteristic measuring device 23 with the ohmmeter. Procedures for decreasing the contact resistance of any electrode consists of increasing the number of electrodes and soaking the immediate area of the electrodes with a saltwater and soap detergent solution.

It is necessary to keep the contact resistance low in order to avoid leakage of the high voltage current signal in wires 13, 11 and 12 into the low voltage potential wires 16, 17 and 18. Before any data are taken, it is often prudent to check to determine if leakage is present.

The above may be accomplished by injecting current into one end of the electrode array, for example, at junction 32, and taking a potential reading between electrodes 15a and 15b. Wires 11 and 12 are then connected together at junction 32 and the wires at junction 31 and reconnected to wires 11 and 12. If there is any leakage anywhere along the circuit, the result, when compared at junctions 31 and 32 will be different. If the contact resistance of the electrodes is low and leakage still results, then the wires of the array probably have damaged insulation and should be replaced.

Referring to FIG. 2 the theory as best understood by the inventors, which results in the formation of the polarizable stratum, is illustrated. An oil or gas reservoir 40 has seepage 41, 41a, 41b, or 41c, for example, which moves upwardly through the rock stratum 42 until it reaches a position or location 43 near the surface of the earth and there produces a distinctive anomaly over the reservoir. Possible mechanisms for this alteration of electrical properties are (1) reaction of seepage hydrogen sulfide gas with sedimentary iron forming pyrite which is polarizable; and (2) modification of the oxidation reduction characteristics of the near surface layers. Other possible mechanisms may exist.

The seeping hydrocarbons may alter the electrical properties of only some of the near surface formations; therefore, it is important to vary the array spacing in order to ascertain and focus on the particular anomalous layers.

Not all anomalous electrical properties in a sedimentary basin are due to hydrocarbon seepage. Near surface lithology changes can cause resistivity anomalies. Sedimentary pyrite, montmorillonite clay, or graphite can cause polarization anomalies. In order to evaluate the mapped anomalies, shallow (a few hundred feet) low-cost holes are drilled and samples of the anomalous material removed and analyzed. If the anomaly appears to be due to hydrocarbon seepage effects, follow-up work can be done with other geophysical tools (for example, seismic reflection).

When (FIG. 2) current is applied through electrodes 10a and 10b from generator 14, it passes through the ground as indicated by the solid lines 44. In addition, opposing the current flow are induced fields represented by the dashed arrows 45. In addition to the above, there may also be induced polarization effects in the earth.

Data Processing

Figure 3:
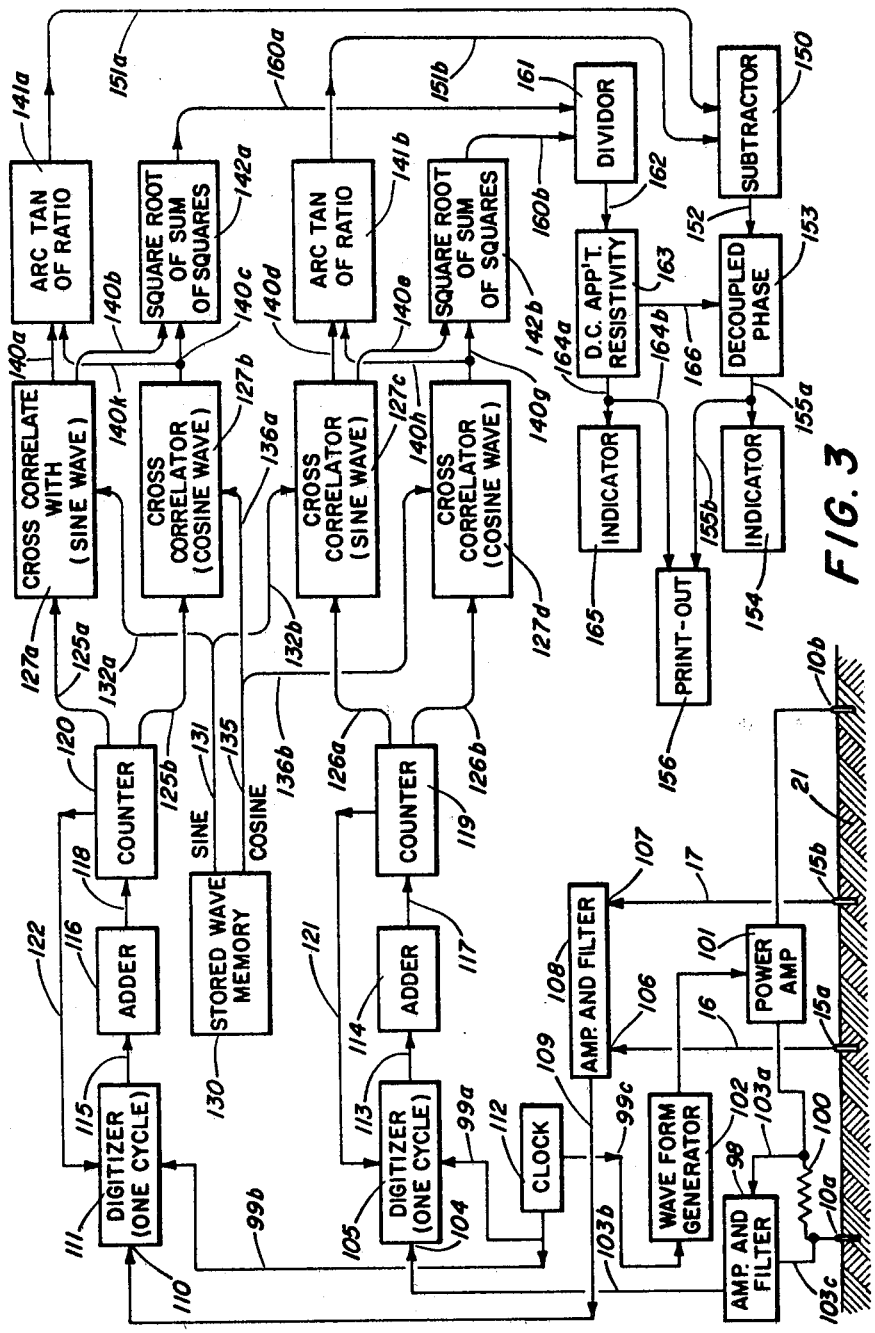
FIG. 3 is a flow chart of the data processing scheme.

Referring to FIG. 3 the preferred embodiment of the data acquisition and processing apparatus is illustrated as a block diagram. Signals to electrodes 10a and 10b are coupled through a shunt 100 from a power amplifier 101 which is controlled or receives its signal from wave form generator 102. Wave form generator 102 obtains its control signal from a clock 112 through a wire 99c. Current passing through shunt 100 develops a voltage across the shunt. The shunt voltage is the characteristic voltage having the phase and amplitude of the current passing through shunt 100. This voltage is coupled through wire 103a and 103c to the input of amplifier and filter 98. The output from amplifier and filter 98 is coupled through wire 103b to the input 104 of digitizer 105. Voltage being measured at electrodes 15a and 15b passes through wires 16 and 17 to the inputs 106 and 107 of amplifier and filter 108. The output of amplifier and filter 108 is supplied through a wire 109 to the input 110 of a second digitizer 111. Digitizers 105 and 111, which are controlled by a clock 112 through wires 99a and 99b, pass the digitized signal through wire 113 to adder 114 from digitizer 105 and through wire 115 to adder 116 from digitizer 111. As each addition is made in adders 114 and 116 an output through wires 117 and 118 is supplied to the inputs of counters 119 and 120, respectively. When a prescribed number of additions are made, a signal is supplied along wires 121 to digitizer 105 and 122 to digitizer 111 indicating that sufficient additions have been made which then may shut off digitizers 105 and 111 and guide the added output from wires 117 and 118 to a pair of outputs 125a and 125b in the case of counter 120 and 126a and 126b in the case of counter 119. Each of the outputs 125a through 126b is supplied to the inputs of a plurality of crosscorrelators 127a through 127d. Along with the inputs 125a through 126b are supplied sine and cosine waves from a stored memory 130. The sine wave is supplied on wire 131 to a pair of wires 132a and 132b to the inputs of crosscorrelators 127a and 127c. The cosine wave is supplied on wires 135 to a pair of wires 136a and 136b to crosscorrelators 127b and 127d. The outputs from cross-correlators 127a through 127d are applied to a plurality of computing circuits. Crosscorrelators 127a and 127b supply an output along wire 140a and from crosscorrelator 127b through a wire 140b to the input of a circuit 141a for computing the arc tangent. Output along wire 140b and from crosscorrelator 127b on wire 140c is applied to a circuit 142a for computing the square root of the sums of the squares. A second arc tangent computing circuit 141b has an input from wire 140d which is connected from the output of crosscorrelator 127c and a second input through wire 140h from crosscorrelator 127d. A second output along wire 140e is coupled from crosscorrelator 127c to a square-root-of-the-sum-of-the-squares calculator circuit 142b along with an output from crosscorrelator 127d through wire 140g.

The values derived from the arc tangent computation circuits 141a and 141b are supplied to the input of a subtraction circuit 150 through a pair of wires 151a and 151b. The output from the subtraction circuit 150 is then supplied through a wire 152 to the input of a circuit 153 along with the output of a D.C. apparent resistivity circuit 163 through a wire 166 which calculates the decoupled phase and supplies this result to a visual indicator 154 through a wire 155a. The results can also be tabulated by coupling the output through a wire 155b to a print-out apparatus 156. The circuits for calculating the square root of the sum of the squares labeled 142a and 142b have their inputs coupled from crosscorrelators 127a and 127b through wires 140b and 140 to circuit 142a and from crosscorrelators 127c and 127d through wires 140e and 140g. The outputs of circuits 142a and 142b are coupled through wires 160a and 160b to a dividing circuit 161. The output from dividing circuit 161 is coupled through a wire 162 to a circuit 163 for calculating the D.C. apparent resistivity. The output from this circuit as previously mentioned is coupled through a wire 166 to an input of phase circuit 153. A second output is coupled through a wire 164a to a visual indicating means 165. The output can also be coupled through a wire 164b to a print-out apparatus 156. Prior to operation, each channel should be checked to determine if they produce identical results. If results are not identical the channels must be calibrated to make them identical.

The above-described circuit operates as follows:

Clock 112 controls the basic cycle of the entire apparatus. At the proper time an output from clock 112, which may be a pulse, is supplied through a wire 99c to wave-form generator 102 which generates a wave form suitable for electrical exploration. The frequency and duration of this has been previously explained. The output from wave-form generator 102 is supplied to a power amplifier 101 which generates a current through shunt 100 through electrodes 10a and 10b to earth 21. As the current passes through shunt 100, voltage is generated which is conveyed through wire 103 to the input 104 of digitizer 105. As the current passes through ground 21 it generates a voltage having a phase different from that being generated by amplifier 101 which is detected by electrodes 15a and 15b. The voltage thus detected is supplied to inputs 106 and 107 to amplifier 108, through wire 109 to the input 110 of digitizer 111. Clock 112 controls the digitizers along wires 99a and 99b and digitizes one cycle of the received signal which is then delivered to adders 114 and 116, respectively.

In order to improve the signal-to-noise ratio normally a succession of transmitted current cycles is received and added. The number that are added and the result of the addition are set into counters 119 and 120. The number of total signals or cycles may vary, depending upon the amount of noise present at the exploration site and other factors. The counter, when it reaches a predetermined number of additions, signals the digitizers 105 and 111 to cease receiving signals and transmits the added results to the crosscorrelators 127a through 127d. Basically, crosscorrelators 127a and 127c are calculating the imaginary components of the transmitted signal (current) and the received signal (voltage). In order to determine the phase difference between the transmitted and received signals, a stored memory circuit 130 is supplied, which provides both a sine wave reference along wire 131 and a cosine wave reference along wire 135. The imaginary portion of the received signal is formed in crosscorrelator 127a by calculation using the information from counter 120 and a sine reference along wire 132a. The real portion of the received signal is calculated in crosscorrelator 127a by taking the information from counter 120 and operating on the information from the cosine wave reference on wire 136a. The ratio of the imaginary portion of the received signal generated in crosscorrelator 127a to the real portion of the signal generated in 127b gives the tangent of the phase angle of the received signal. Circuit 141a generates the arc tangent from the tangent which gives the phase angle of the received signal. The corresponding calculations for the transmitted signal are performed in crosscorrelators 127c and 127d. The imaginary portion is obtained from 127c and the real portion from 127d. The phase angle of the transmitted or input current signal is obtained in 141b which gives the arc tangent of the ratio of the imaginary portion of the real portion.

The square root of the sum of the squares from circuit 142a gives the magnitude of the received signal voltage, while 142b obtains the magnitude of the transmitted current. The phase angle of the transmitted current to the ground is subtracted from the phase angle of the received voltage array which signals are received from wires 151a and 151b, respectively, to obtain the phase difference between the transmitted current and the received voltage; that is, the phase angle $\phi_m$. The final processing takes place in circuits 150 and 153.

The magnitude of the received voltage of the array is divided in circuit 161 by the magnitude of the transmitted current to the array. The ratio is then multiplied by the geometric factor of the array to obtain the apparent resistivity.

The measured phase angle ($\phi_m$) is used along with the measured apparent resistivity ($\rho_a$) to compute the phase angle of the electromagnetic coupling term. The decoupled phase angle, $\phi_c$ is then equal to the measured phase angle minus the phase angle of the electromagnetic coupling term. The two basic measurements of the field acquisition are then the apparent resistivity, ($\rho_a$), and the decoupled phase angle ($\phi_c$). The results are then supplied to visual indicators 154 or 165 may also be printed out for permanent reference on apparatus 156.

Electromagnetic (EM) Coupling

Figure 4:
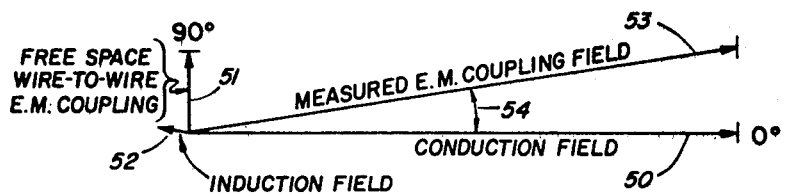
FIG. 4 is a vector diagram of the various components of the electromagnetic field for the electrode array.

Referring to FIG. 4, a vector diagram illustrates various components of the EM fields which can be summed to form the observed EM voltage field. The D.C. conduction vecotor 50 is in phase with the transmitter current and is defined as having zero degrees phase. The magnitude of this vector is closely equal to the measured field magnitude; therefore, by noting the magnitude of the observed field, or equivalently, the observed apparent resistivity, the conduction field vector is known. The free-space, wire-to-wire EM coupling vector 51 occurs because the current in the transmitter wire 11 (see FIG. 1) generates a magnetic field which induces a voltage in the receiver wire 16. The phase of this vector will always be exactly 90°. The magnitude of the free-space coupling vector 51 will depend only on the array geometry, for example, the separation between the transmitter and receiver wires and the length of the transmitter and receiver wires and the frequency of the input current.

By keeping the frequency and the geometry precisely fixed, the magnitude of vector 51 will be known. The third vector is the induction field vector 52. The phase of this field as measured at the surface is unknown. Numerical calculations have shown that for the Schlumberger array, where the transmitter and receiver wires are close together, the magnitude of the induction field vector is much less than 1 percent of either the free-space vector 51 or the conduction vector 50; therefore, the induction field vector 52 is negligible. The EM coupling field 53 along with its angle 54 can be predicted accurately since it is the sum of conduction field 50 (which is determined by the measured apparent resistivity) and the free-space field 51 (which is determined by the fixed-array geometry and frequency). In practice, the determined EM coupling is computed assuming the wires are resting on a homogeneous half-space (which has no induced polarization response) and which has a resistivity equal to the apparent resistivity measured by the Schlumberger array at a particular recording station. The equations used for this calculation are given in a later section.

When the D.C. apparent resistivity of the earth is used for the half-space resistivity in the equations, numerical comparisons between the half-space calculation and the exact multilayer calculation show that the correct EM coupling phase is obtained from the half-space calculation whether the earth is homogeneous half-space or consists of several layers.

Figure 5:
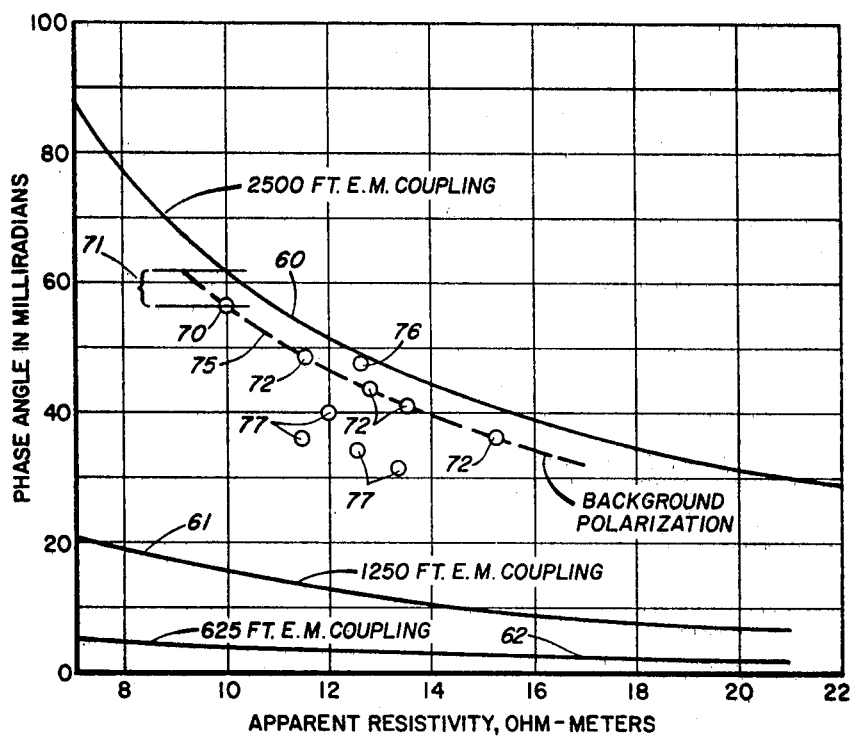
FIG. 5 is a plot of the phase angle due to the electromagnetic coupling term (or EM coupling) over a homogenous half-space for an array having various lengths and includes a representative plot of measured phase angles superimposed on a plot of a theoretical electromagnetic coupling phase angle curve.

Referring to FIG. 5, the EM coupling phase angle for the input current fixed at a frequency of 0.1 Hertz with a wire-to-wire separation fixed at 0.0085 meter and for three different lengths of the Schlumberger array are shown. Where 5a (the spacing between the pair of electrodes 10a and 10b) equals 2500 feet (762 meters) for curve 60, 5a equals 1250 feet (381 meters) for curve 61, and 5a equals 625 feet (190.5 meters) for curve 62. These hyperbolic EM coupling curves can be closely approximated by the following equations. The EM coupling phase in milliradians for 0.1 Hertz and 0.0085 meter separation are:

$$\phi_{EM} = 621/\rho_a \text{ for } 5a = 2,500 \text{ feet (762 meters)}$$

$$\phi_{EM} = 144/\rho_a \text{ for } 5a = 1,250 \text{ feet (381 meters)}$$

$$\phi_{EM} = 34/\rho_a \text{ for } 5a = 625 \text{ feet (190.5 meters)}$$

$$\phi_{EM} = 8/\rho_a \text{ for } 5a = 312 \text{ feet (95.1 meters)}$$

apparent resistivity ($\rho_a$) is measured in ohmmeters. The contribution of the EM coupling is negligible when its value is about 1 milliradian or less. Thus, changing the wire spacing or array spacing may make the EM coupling correction unnecessary since it will have no substantive effect on the decoupled phase angle.

The Decoupled Phase Angle

The measured phase angle for the Schlumberger array is a contribution of the EM coupling phase and a phase shift which is due to induced polarization in the earth. It has been discovered that the induced polarization (IP) phase angle is the best indicator of hydrocarbon seepage effects. It has also been discovered that the EM coupling phase angle, however, can be the largest part of the measured phase angle since the apparent resistivity of the earth can easily change by a factor of 4 or more along a profile line. Many of the measured phase angle anomalies are, in fact, apparent resistivity anomalies with no associated IP anomaly; therefore, it is considered essential that the IP phase angle be separated from the EM coupling phase which depends on the apparent resistivity. This is done by subtracting the EM coupling phase angle (which can be accurately predicted as discussed in the last section) from the measured phase angle. The residual or decoupled phase angle accurately indicates anomalous polarization in the earth.

In actual practice in our equipment, the decoupled phase angles are calculated using simple approximations to the EM coupling:

$$\phi_c = \phi_m - 621/\rho_a \text{ for } 5a = 2,500 \text{ feet (762 meters)}$$

$$\phi_c = \phi_m - 144/\rho_a \text{ for } 5a = 1,250 \text{ feet (381 meters)}$$

$$\phi_c = \phi_m - 34/\rho_a \text{ for } 5a = 625 \text{ feet (190.5 meters)}$$

$$\phi_c = \phi_m - 8/\rho_a \text{ for } 5a = 312 \text{ feet (95.1 meters)}$$

where
- $\phi_c$ = the decoupled phase angle in milliradians
- $\phi_m$ = the measured phase angle in milliradians (the difference between the phase of the output voltage of the array and the phase of the input current to the array)
- $\rho_a$ = apparent resistivity of the earth in ohmmeters as measured by the Schlumberger array
- 0.1 Hertz = the frequency of the input current to the array
- 0.0085 meter = the wire-to-wire separation between the input current wires and the output voltage wires.

In the aforementioned equations for the decoupled phase angles, the terms which have the apparent resistivity in the denominator represent the EM coupling phase angle in milliradians for the conditions stated. The approximate general equation for the EM coupling phase angle (i.e., less than about one foot between wires 11 and 16) is as follows:

$$\phi_{EM} = 1000 \tan^{-1}\left\{ \frac{\omega\mu(L^2 - b^2)[(L-b)(LT-NT) - (L+b)(LR-NR) - 2(ST-SR)]}{8b\rho} \right\}$$

where:
- $\omega$ = angular frequency = $2\pi f$
- $\mu$ = magnetic permeability of half space, assumed equal to free space value ($4\pi \times 10^{-7}$)
- L = half the distance between the current electrodes = $2\frac{1}{2}a$
- $\rho$ = resistivity of half space, in ohm meters
- $ST = ((L-b)^2 + H^2)^{\frac{1}{2}}$
- $SR = ((L+b)^2 + H^2)^{\frac{1}{2}}$
- $LT = \ln((L-b) + ST)$
- b = half the distance between the potential electrodes = $\frac{1}{2}a$
- $LR = \ln((L+b) + SR)$
- $NT = \ln(ST - (L-b))$
- $NR = \ln(SR - (L+b))$
- H = wire separation, in meters The method described here is a preferred embodiment for decoupling the phase angle data.

As previously stated, FIG. 5 is a representative plot of measured phase angles in milliradians plotted against apparent resistivity of the earth as determined by the Schlumberger array for each recording station. The measured data points are presented in FIG. 5 by circles. Since the measured phase angle is plotted against the measured apparent resistivity, there is no relationship between the order in which these data points fall on such a graph and the order and location in which these data points occur on the surface of the earth. A separate bookkeeping system is required to translate the analysis from such a plot back to the interpretation of the anomaly on the surface of the earth. Superimposed on FIG. 5 is the phase angle in milliradians of the EM coupling curve 60 for the Schlumberger array used to make the measurements. In this case, an array of length 2,500 feet (762 meters), wire-to-wire separation of 0.0085 meter and an input current frequency of 0.1 Hertz was used. The data points will normally fall below the phase angle of the EM coupling curve 60 indicating a phase lag relative to the phase lead of the EM coupling curve. The decoupled phase angle is then the vertical distance 71 in milliradians between the measured phase angle for the measured apparent resistivity and the EM coupling phase angle for the apparent resistivity. This is illustrated in FIG. 5 for the data point labeled 70 by the vertical distance 71. Thus for data point 70 the measured apparent resistivity is 10 ohmmeters, the measured phase angle is 57 milliradians, and the decoupled phase angle is −5 milliradians.

All the data points labeled 72 falling slightly below the EM coupling phase angle curve 60 and lying roughly along the dashed curve 75 have a decoupled phase angle of between a −5 and −6 milliradians. The data points labeled 72 would be interpreted as being indicative of a background induced polarization effect of the local sediments and are, therefore, indicative of a no-anomaly or no-response situation.

Occasionally a data point such as 76 will lie above the background polarization curve 75, and this point might be interpreted as being due to a negative induced polarization effect. The data points labeled 77 in FIG. 5 with decoupled phase angles varying from a −10 to a −18 milliradians are data points which would be considered definitely anomalous.

As a result of the decoupling operation, it is possible to determine whether a single station measurement is anomalous or not with some experience in the area. A significant decoupled phase angle anomaly would be any decoupled phase angle greater in magnitude than 5 to 10 milliradians, depending on the array length and one's experience in the area.

An additional processing step to enhance the decoupled phase angled anomaly is sometimes used. If there are a large number of measurements available, both over the anomaly and away from the anomaly, then the average of the off-anomaly decoupled phase angles can be taken. This average is considered to be a background induced polarization effect of the local, shallow sedimentation and shallow geology (illustrated by curve 75 of FIG. 5) which is considered to be fairly constant for a small region but varying from region to region. The determined background induced polarization effect, which usually has a magnitude less than 5 milliradians, can then be subtracted from all decoupled phase angle measurements giving a final picture of a local anomaly with the off-anomaly values being very small and varying randomly about a phase of zero milliradians. Using this approach, we have obtained anomalous decoupled phase angles over known hydrocarbon producing fields as high as −16 milliradians with the off-field background level reduced to ±1 milliradian. The accuracy of the phase angle measurement is ±1 milliradian.

FOCUSING THE ARRAY ON THE ANOMALOUS REGION

The basic concept of the hydrocarbon exploration method disclosed here is that hydrocarbons seep from a deeper reservoir and geochemically alter the electrical properties of the shallow sediments. This geochemical reaction, however, could occur at a depth which may vary from location to location. As a result, the electrical anomaly (either the apparent resistivity and/or the decoupled phase angle) will be different for different lengths of the Schlumberger array. The Schlumberger array is primarily sensitive to electrical changes in the earth for the depth range of 25 percent to 50 percent of the array length. Thus, a Schlumberger array of length 2,500 feet (762 meters) would primarily be detecting electrical changes in the earth from a depth of 600 feet (182.88 meters) to 1,200 feet (365.76 meters) and would be relatively insensitive to electrical changes either at 100 feet (30.48 meters) or at 5,000 feet (1524 meters). As a result, for any shallow electrical anomaly, there will be an optimum length of the Schlumberger array which would give a maximum value for the anomaly.

The effect of different lengths of a Schlumberger array for the same frequency of the input current is illustrated in FIG. 6. In this example, there is a single region 80 with altered electrical properties at a fixed depth 81 below the surface of the earth. The current flow paths for short array 82 have too shallow a penetration to pass through and thus detect the layer 80. The long space array 84 has too deep a penetration of the current flow paths 85 to have a substantial effect from anomalous layer 80. The middle array 86 has substantial current flow at a depth 83 in the anomalous layer 80. The array is focused on this layer; therefore, in a reconnaissance survey in a new area, the electrical measurements will be made at several different lengths of the array to maximize the effect of any anomalous zone.

As also illustrated generally in FIG. 1, the first electrodes 15a and 15b are placed at a spacing "a" while the second electrodes 10a and 10b may be disposed in line and symmetrically placed on each side thereof in a spacing M(a) where M is a constant. The spacing for both sets of electrodes may be incrementally proportionally changed by a selected factor "b" in carrying out the determination of maximum value electrical anomaly for the given area.

The depth of penetration can also be altered by changing the frequency of the input current to the array. For an array of given length, lower frequencies will penetrate further than do higher frequencies, as a result of the skin depth effect.

The above described method of focusing on an anomalous zone will operate using any other form of electromagnetic reconnaissance system including that performed in the frequency domain or the time domain.

EVALUATION OF THE ELECTRICAL ANOMALY

Once an electrical anomaly has been found, several things can be done to evaluate whether the electrical anomaly has been caused by hydrocarbon seepage from a deeper reservoir. The apparent resistivity and/or the decoupled phase angle can be determined at a single field site for many different spacings of the array as illustrated by curve 90 in graph labeled "Data" in FIG. 7. These data can be used to obtain a depth model of the resistivity or the induced polarization as a function of depth illustrated by the graph labeled "Earth Model" by the curve 91 in FIG. 7. Such a model predicts the depth to the anomalous electrical zone. A shallow and, therefore, relatively inexpensive hole can then be drilled through the predetermined anomalous zone. A similar hole is also drilled through the same geologic zone at a location off the anomaly.

During the drilling of the shallow hole, the cuttings from the hole can be collected and logged. The cuttings could then be used to determine the shallow lithology. The samples may also be checked for resistivity and induced polarization anomaly by lab methods designed for that purpose.

Once the shallow holes are drilled, resistivity logs and induced polarization logs can also be obtained as is illustrated by curve 92 in the graph labeled "Well Log" in FIG. 7. With the downhole electrical logs, the depth of the electrical anomaly can be determined accurately. Once the depth of the electrical anomaly is known accurately, the well cuttings from this depth are used to determine the cause of the electrical anomaly. The same analyses are performed on the cuttings from the hole drilled off the anomaly to verify that the cause has been determined.

It is obvious that the coring technique is useful regardless of the electromagnetic method used for the location of the anomalous zone or even whether it is in the frequency or the time domain method of electromagnetic exploration.

EXAMPLE 1

Figure 8:
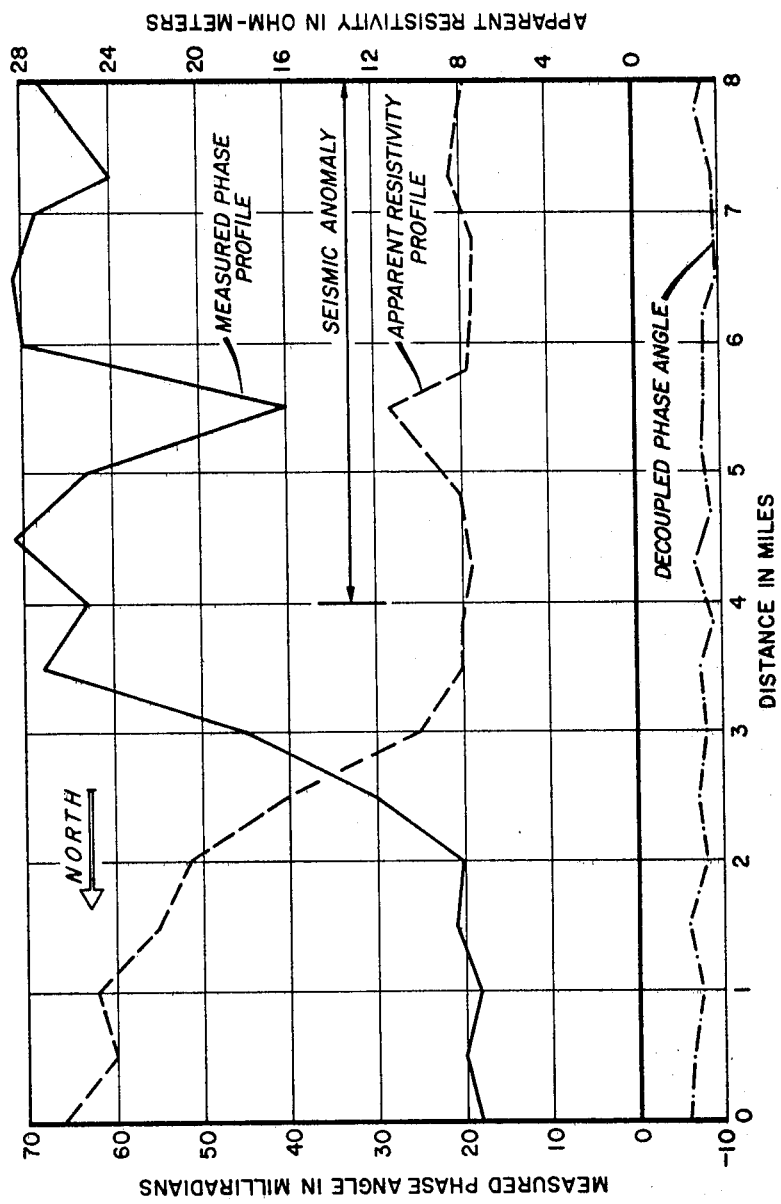
FIG. 8 is a plot of apparent resistivity, measured phase angles, and decoupled phase angles along a profile line of an actual field test over a seismic anomaly in Nebraska.

One of the important aspects of this invention is the determination of the decoupled phase angle which takes into account variations in apparent resistivity and its effect upon the measured phase angle profile. An example of a decoupled phase angle which illustrates an anomaly in both the measured phase angle profile and the apparent resistivity is shown in FIG. 8. These data were taken with a 2,500-foot (762 meter) Schlumberger array with 0.0085 meter for the wire-to-wire separation and 0.1 Hertz as the frequency of the input current.

It can be noted that there is a 3 to 1 change in the apparent resistivity of the earth along the profile line as illustrated in FIG. 8, with a corresponding 3 to 1 change in the measured phase angles along the profile line. The large measured phase angles correspond to the low apparent resistivity because the EM coupling phase angle is inversely proportional to the apparent resistivity. The decoupled phase angle profile illustrates that once the phase angle of the EM coupling curve is accounted for and the variations in the data due to variations in the apparent resistivity along the profile line is removed through the decoupling operation, then the decoupled phase angle shows no anomaly, particularly over the seismic anomaly.

Two wells were drilled on the seismic anomaly. Both holes encountered some oil and porosity, but the permeability was so low that commercial production was not possible. The interpretation of the electrical anomaly agrees with the results of no commercial production. Since the reservoir was not permeable, the hydrocarbons could not seep to the surface. There is no high resistivity anomaly at the surface. There are no anomalous induced polarization effects at the surface.

EXAMPLE 2

Another example of actual data is seen illustrated in FIGS. 9 through 12 which show representative samples of actual data from a gas field in southeastern Oklahoma. The contours in these figures are of the pay thickness of a sand body which is at a depth of roughly 3,500 feet (1066.8 meters). Two contours are shown, zero pay thickness which outlines the edge of the producing field, and 100 feet (30.48 meters) of pay thickness. Maximum pay thickness is about 160 feet (98.77 meters).

Figure 9:
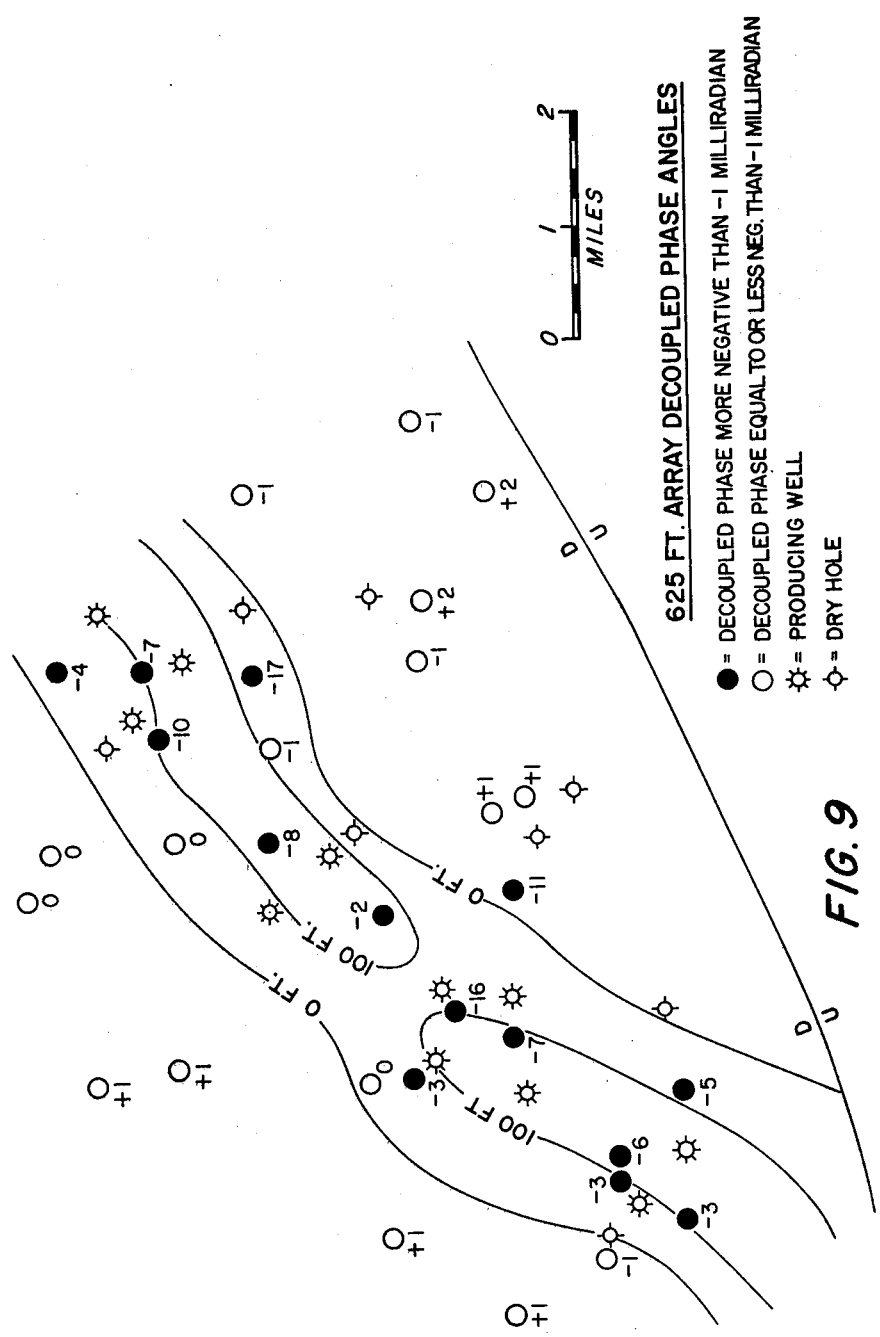
FIG. 9 is a plot of decoupled phase angle anomaly for a 625-foot (190.5 meter) array from an actual survey over a gas field in southeastern Oklahoma.

FIG. 9 shows the data for a 625-foot (190.5 meters) long array. The decoupled phase angle is plotted at the center of each array. All of the values off-field are very close (±2 milliradians) to a background level of −4 milliradians, which has been subtracted from the data. On-field, there is a prominent negative anomaly of up to −16 milliradians.

Figure 10:
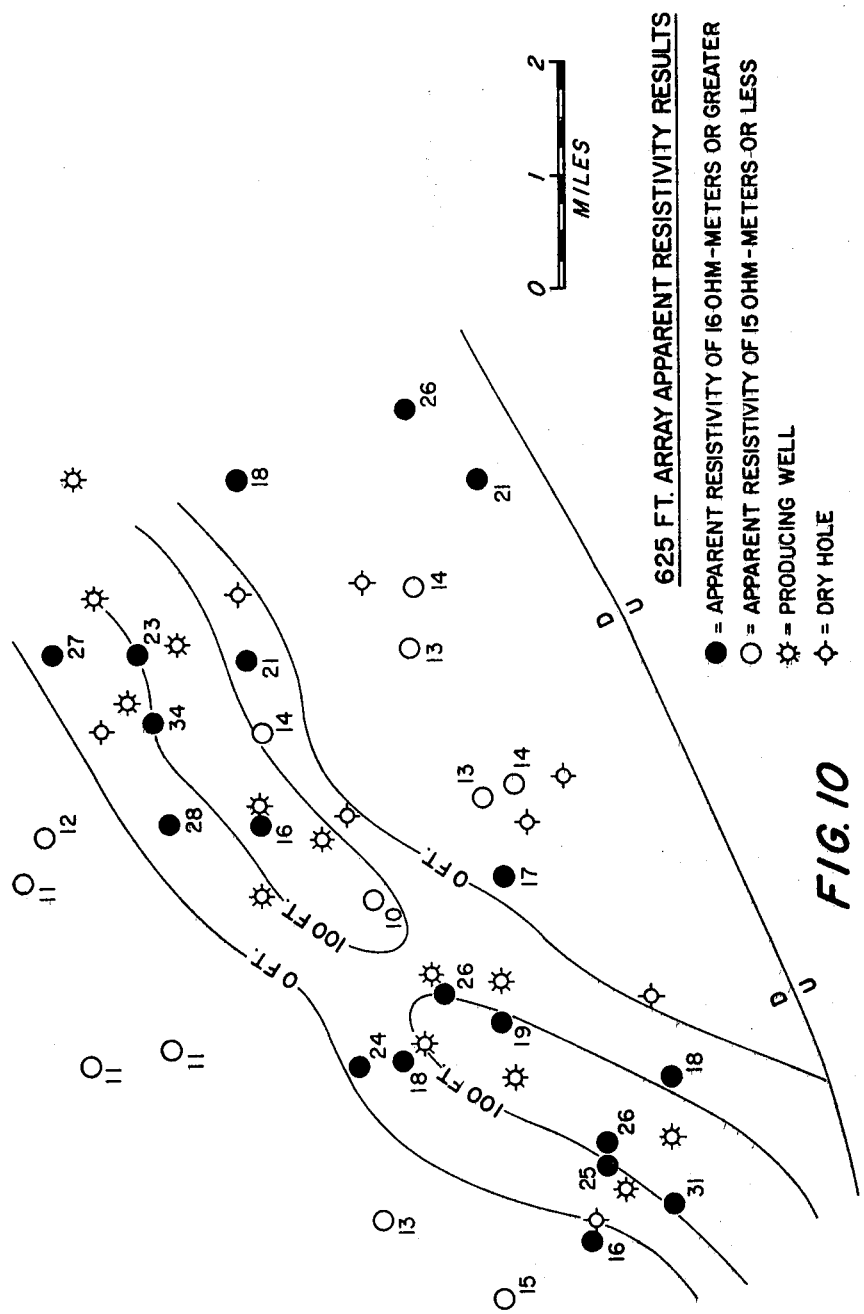
FIG. 10 is a plot of the apparent resistivity anomaly for a 625-foot (190.5 meter) array over the same gas field in southeastern Oklahoma.

The actual decoupled phase angles are marked next to the symbols representing the test sites on each of the figures. FIG. 10 is a similar map for 625-foot (190.5 meters) apparent resistivity results. There is a prominent apparent resistivity high coincident with the field. FIGS. 9 and 10 show the utility of this method for locating commercial hydrocarbon reservoirs.

Figure 11:
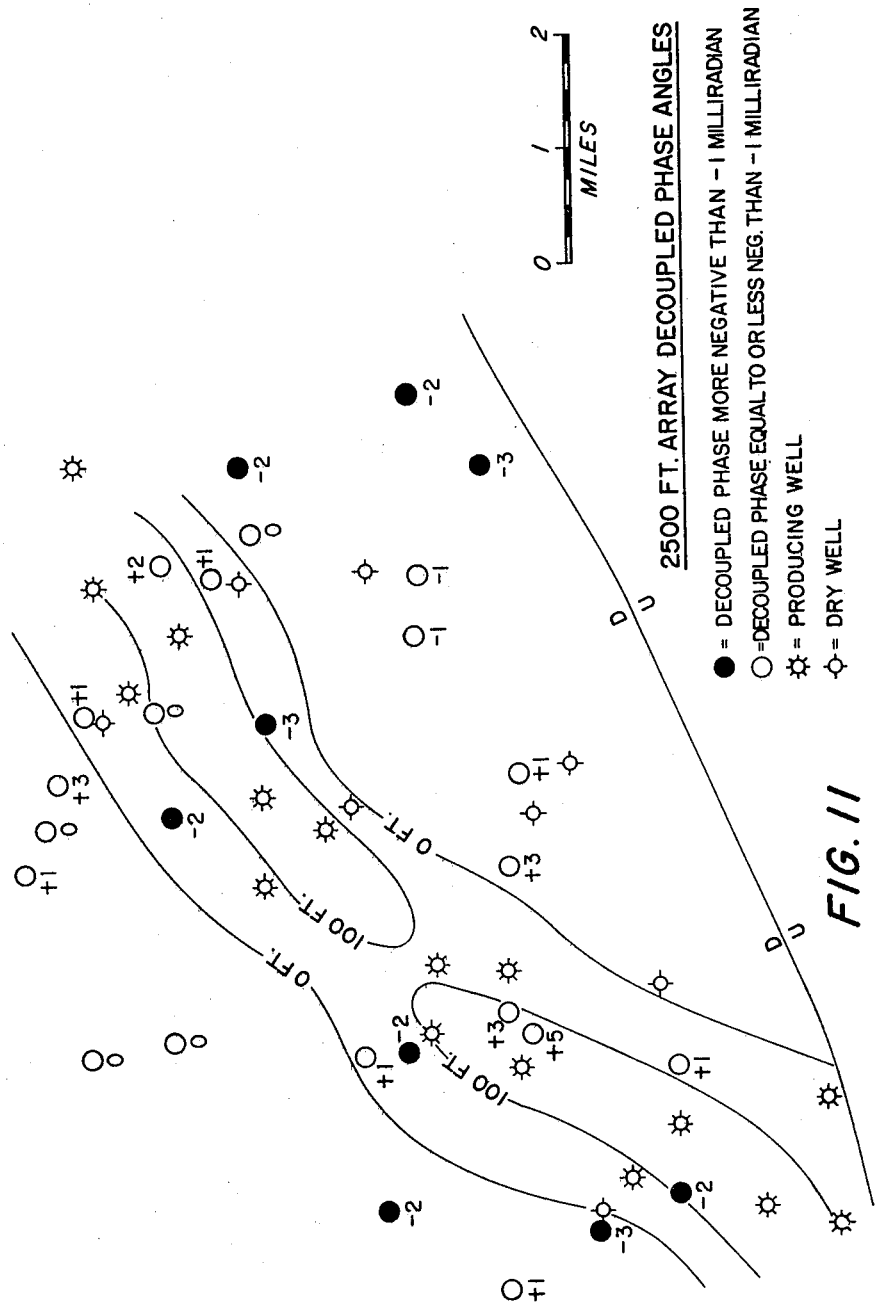
FIG. 11 is a plot of the decoupled phase angle anomaly for the 2500-foot (762 meter) array from a survey over the same gas field as that illustrated in FIGS. 9 and 10.
Figure 12:
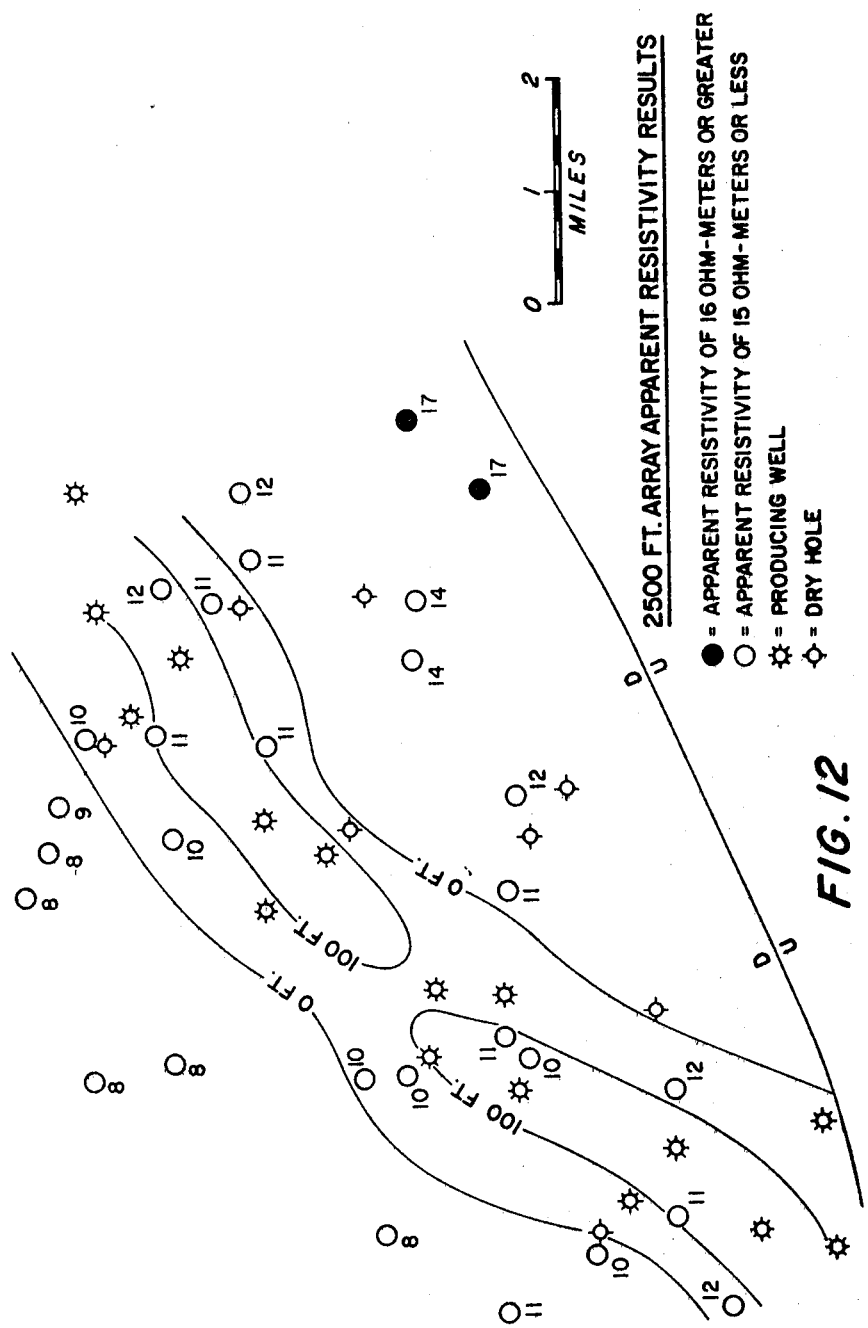
FIG. 12 is a plot of the apparent resistivity anomaly for a 2500-foot (762 meter) array of a survey over the same gas field illustrated in FIGS. 9 and 10.

FIG. 11 illustrates a 2,500-foot (762 meters) array decoupled phase angle, and FIG. 12 shows a 2,500-foot (762 meters) array resistivity in the area of the Ashland gas field. Neither map shows a very close correlation with the producing field. These FIGS. 9 and 10 versus 11 and 12 clearly illustrate the importance of the concept of focusing the array spacing on the electrical anomaly.

Figure 13:
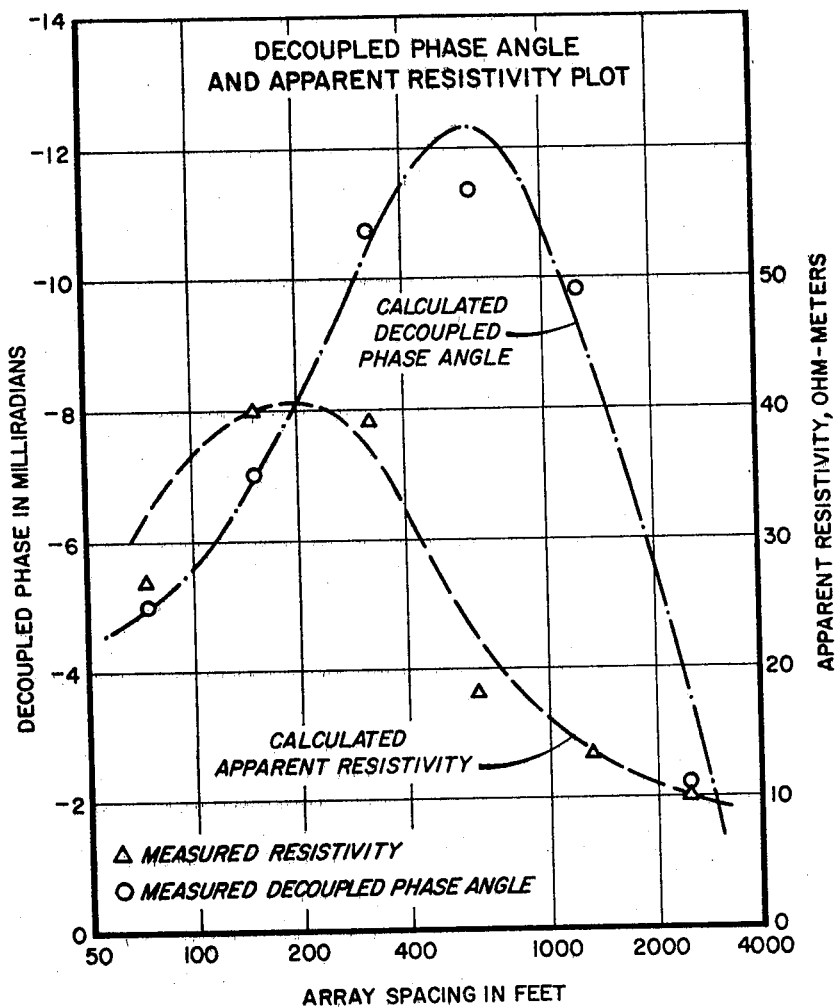
FIG. 13 is a plot of measured and calculated apparent resistivities along with a plot of measured and calculated decoupled phases at a site from the area illustrated in FIGS. 9 and 10.
Figure 15:
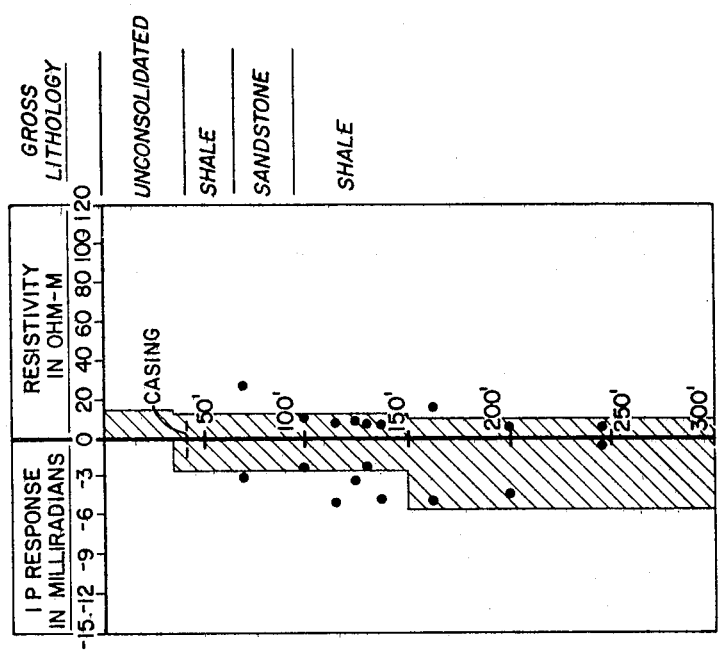
FIG. 15 is a plot of a depth model of the earth along with the downhole resistivity and phase measurements of a site off (but near) the gas field illustrated in FIGS. 9 and 10.
Figure 14:
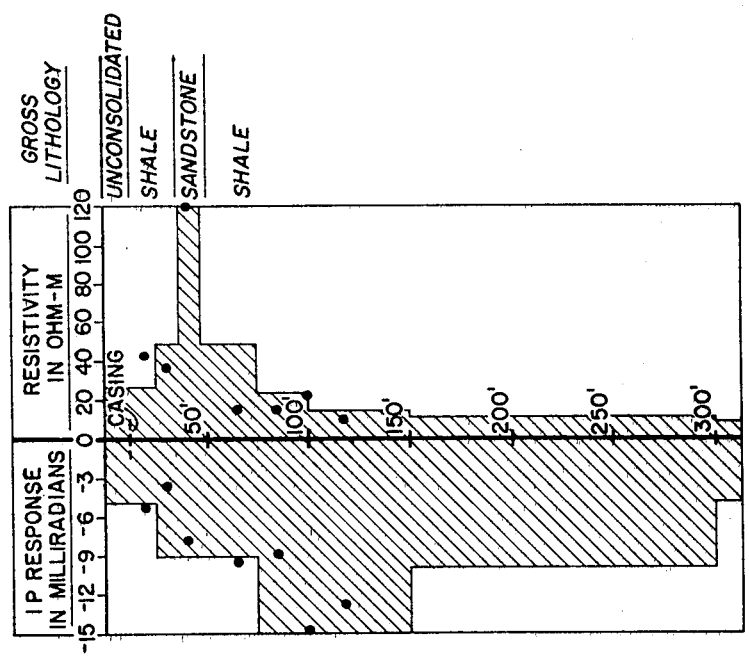
FIG. 14 is a plot of a depth model of the earth utilizing the data illustrated in FIG. 13, along with downhole resistivities and phase measurements for the aforementioned site.

Plots of multispacing data from this gas field are illustrated in FIG. 13. The solid lines through the data points in FIG. 13 represent calculated results for a theoretical earth model. The model is shown by the hatched lines in FIG. 14. The anomalous polarizable zone is from about 25 feet (7.62 meters) to 300 feet (91.44 meters), and the anomalous resistivity zone is from about 25 feet (7.62 meters) to 100 feet (30.48 meters). The downhole measurements shown on FIG. 14 (heavy dots) agree closely with the computer interpretation. The hole was blocked at 130 feet (39.62 meters) when the downhole survey was run so measurements could not be made below that point. For comparison, the resistivity and polarization, computer interpretation and downhole results are shown for an off-field site where there is no surface anomaly in FIG. 15. There is no high polarization or resistivity anywhere in the hole.

Conclusions

A unique method and apparatus for electromagnetic hydrocarbon exploration has been described. The method and apparatus provides a demonstrated manner for locating an underground hydrocarbon deposit. A method for focusing the electrode array on the particular polarizable stratum formed as a consequence of the underground hydrocarbon deposit has been described along with a technique for coring the underground polarizable stratum to determine if the polarizability is caused by a hydrocarbon deposit or by some other geological process. The elimination from consideration of all polarizable stratum but those created by hydrocarbons substantially improves the reliability of the technique.

It is obvious that modifications and changes can be made in the invention and still be within the spirit and scope of the invention as described in the specification and appended claims.

What we claim is:

1. A method of electrical hydrocarbon prospecting over an area on the surface of the earth to locate a subsurface polarizable stratum which is indicative of the presence of a hydrocarbon deposit lower than said stratum comprising:

(a) placing a first set of electrode means in the surface of the earth and having a preselected spacing, "a";
   (b) placing a second set of electrode means in the surface of the earth having a spacing M (a) in line and symmetrically placed on each side of said first electrode means, where M is a constant;
   (c) determining the presence of an electrical anomaly indication that is identifiable with said polarizable stratum;
   (d) changing the spacing of said first and second electrode means in like proportion repeatedly while effecting step (c) for each said spacing to determine that spacing yielding a maximum value for said electrical anomaly; and
   (e) proceeding with the electrical prospecting over said area on the surface of the earth using said spacing yielding said maximum value to determine the areal extent of said subsurface polarizable stratum.

2. A method as described in claim 1 wherein said electrical anomaly is determined by generating a current flow path at a depth in said stratum and detecting voltage resulting from the interception of these current flow paths, and detecting apparent resistivity and decoupled phase angle to determine said electrical anomalies.

3. A method as set out in claim 1 or 2 wherein "a" is a preselected minimum spacing and said spacing is increased.

4. A method as set out in claim 1 or 2 wherein "a" is a preselected maximum spacing and said spacing is reduced.

5. A method as set out in claim 1 or 2 additionally comprising:

(a) boring a core through said subsurface polarizable structure to obtain a sample of said polarizable stratum; and
   (b) analyzing said sample to determine the composition of said stratum.

6. A method of electromagnetic hydrocarbon prospecting over an area on the surface of the earth to locate a subsurface polarizable stratum which is indicative of the presence of a hydrocarbon deposit lower than said stratum comprising:

(a) implanting in electrical communication with said stratum, spaced first pair of electrode means to generate current which flows through paths at a depth in said stratum and implanting spaced second pair of electrode means to detect voltage resulting from the interception of these current flow paths, each said second electrode means being positioned at selected distance and direction from a respective first electrode means;
   (b) processing said detected voltage to derive an electrical anomaly indication;
   (c) relocating said electrode means spacing proportionally to intercept current flow paths at a different depth in said stratum and processing to derive a characteristic electrical anomaly indication;
   (d) repetitively relocating as necessary said electrode means spacing until the resulting electrical anomaly indicates that the maximum portion of said current flow path is passing through said polarizable stratum, thereby locating said polarizable stratum; and
   (e) proceeding with the remainder of said electromagnetic prospecting over said area on the surface of the earth using said spacing which indicates that said maximum portion of said current flow path is passing through said polarizable stratum.

7. A method as set out in claim 6 said polarizable stratum is conformed by:
(a) boring a core into said subsurface polarizable stratum to obtain a sample of said stratum; and (b) analyzing said sample to determine the composition of said stratum.

8. A method as set forth in claim 7 wherein further confirmation of the polarizable stratum is effected by: boring and extracting a core from said subsurface stratum at an adjacent non-polarized position for comparison to said polarizable stratum core.

* * * * *